United States Patent
Mandai et al.

(10) Patent No.: US 6,759,091 B2
(45) Date of Patent: Jul. 6, 2004

(54) COATING METHOD

(75) Inventors: Toshihiro Mandai, Odawara (JP); Mikio Tomaru, Odawara (JP); Norio Shibata, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/367,170

(22) Filed: Feb. 19, 2003

(65) Prior Publication Data

US 2003/0157251 A1 Aug. 21, 2003

(30) Foreign Application Priority Data

Feb. 19, 2002 (JP) ........................................ 2002-041009

(51) Int. Cl.[7] .............................. B05D 3/12; B05D 1/26
(52) U.S. Cl. ........................... 427/356; 427/8; 427/345; 427/358; 118/602; 118/410
(58) Field of Search ............................ 427/8, 345, 356, 427/358; 118/712, 602, 410

(56) References Cited

U.S. PATENT DOCUMENTS

2002/0015796 A1 * 2/2002 Tomaru et al. ............. 427/420

FOREIGN PATENT DOCUMENTS

| DE | 198 21 771 A1 * | 11/1999 |
| JP | 58-109162 | 6/1983 |
| JP | 7-287843 | 10/1995 |

* cited by examiner

*Primary Examiner*—Katherine A. Bareford
(74) *Attorney, Agent, or Firm*—Sughrue Mion, PLLC (57) ABSTRACT

By optimizing the pressure condition for sucking up an excess of coating liquid with a recovering slit, a coating layer on a web with a very small and even thickness can be obtained. In a coating method using two slits of a coating slit and the recovering slit, a liquid pressure P (MPa) at a suction port of the recovering slit is adjusted in a range of $0.05 > P \geqq 0$. Thus, coating thickness variations in the web width direction of the coating layer formed on the web can be restrained, and score-like coating omission can be prevented from occurring on the coating layer surface.

6 Claims, 4 Drawing Sheets

COATING METHOD

BACKGROUND OF THE INVENTION

1. Field of the Invention

The present invention relates to a coating method, more particularly, to an improvement in extrusion type coating method that is used for manufacturing photosensitive materials and magnetic recording media.

2. Description of the Related Art

Photosensitive materials and magnetic recording media are manufactured through a coating step of forming a coating film by applying a coating liquid, such as a magnetic liquid, to a continuously running substrate sheet (hereinafter referred to as "web"). In recent years, magnetic recording media such as magnetic recording tapes particularly for broadcasting and computer use have been rapidly improved in capacity and recording density, and there has been needed a coating technology capable of providing a magnetic layer which has an extremely thin film thickness and a smooth surface.

Coating apparatuses for applying a coating liquid to the surface of a web include, for example, apparatuses of types such as roll coater, gravure coating, roll coating plus doctor roll, extrusion coating, and slide coating. In recent years, an apparatus of extrusion type has been commonly used to apply a magnetic coating liquid.

One method employing an extrusion type coating apparatus in which the tip of a coating head is pushed against a web, as described in Japanese Patent Application Publication No. 58-109162, has been commonly used in the field of manufacturing magnetic recording media because a thin and uniform coating layer can be obtained by increasing the liquid pressure at the tip of the coating head utilizing the web tension, thereby eliminating the air accompanying the web. However, even in the method of applying a single coat of liquid using this type of coating head, the reduction in coating thickness is limited.

As a method for forming a much thinner coating layer, there is a method in which a very thin coating layer can be formed by applying an excess amount of coating liquid to a web using a web-pushing type extrusion coating apparatus and then scraping off the excess coating liquid with a blade disposed on the downstream side of the extrusion coating apparatus, as described in Japanese Patent Application Publication No. 7-287843. In this case, a device which applies an excess amount of coating liquid to a web is not necessarily limited to the web-pushing type extrusion coating apparatus, but coating apparatuses such as roller coater, gravure coater, and extrusion coater equipped with a back-tip roll can be used.

In the scraping-off type coating apparatus as disclosed in Japanese Patent Application Publication No. 7-287843, however, since the coating liquid recovered by being scraped off with the blade has once been exposed to the atmosphere in a process from the coating apparatus to the blade, the solvent contained in the coating liquid volatilizes, whereby the liquid physical properties such as viscosity and solid content concentration are changed. Thus, the apparatus has a disadvantage in that the recovered liquid must undergo treatment for adjusting its physical properties such as viscosity and solid content concentration before being reused. Further, the apparatus has a disadvantage in that dust is liable to be included in the coating liquid having been applied to the web because the recovered liquid comes once into contact with the atmosphere, so that the recovered liquid cannot be reused because dust cannot be removed even if an excess liquid recovered with the blade is filtered.

With such a background, the present inventors have proposed coating method and apparatus in Japanese Patent Application No. 2001-302402 corresponding to U.S. patent application Ser. No. 10/253,427 and German Patent Application No. 102 44 882.5 such that two slits of a coating slit and a recovering slit are provided so that an excess of coating liquid that has been discharged excessively from the coating slit and applied to a web is sucked up into the recovering slit. According to the coating method and apparatus, the recovered coating liquid can be reused without liquid-adjusting treatment and filtering treatment.

However, the coating method using two slits of the coating slit and recovering slit is a novel coating method exceeding the limit of conventional idea, and it is hence necessary to establish properly optimized coating conditions so as to improve the surface quality of the obtained coating layer. In particular, the pressure condition for sucking up an excess of coating liquid through the recovering slit is of importance in obtaining a coating layer with a very small thickness and high surface quality.

SUMMARY OF THE INVENTION

The present invention has been made in view of the above situation, and an object thereof is to provide a coating method in which in coating with two slits of a coating slit and a recovering slit, the pressure condition for sucking up an excess of coating liquid with a recovering slit is optimized so that a coating layer with a very small and even thickness can be obtained.

To attain the above object, the present invention is directed to a coating method in which in a state where a continuously running web is brought close to a lip surface at a tip of a coating head, a coating liquid sent into the coating head in excess of a desired amount is discharged through a coating slit and is applied to the web, and an excess of coating liquid applied to excess is sucked up through a recovering slit provided on a downstream side of the coating slit in a running direction of the web, wherein: a liquid pressure P (MPa) at a suction port of the recovering slit is adjusted in a range of $0.05 > P \geq 0$.

According to the present invention, in the coating method using two slits of the coating slit and the recovering slit, the liquid pressure P (MPa) at a suction port of the recovering slit is adjusted in the range of $0.05 > P \geq 0$, more preferably $0.02 > P \geq 0$. Thus, coating thickness variations in the web width direction of the coating layer formed on the web can be restrained, and score-like coating omission can be prevented from occurring on the coating layer surface.

To attain the above object, the present invention is also directed to a coating method in which in a state where a continuously running web is brought close to a lip surface at a tip of a coating head, a coating liquid sent into the coating head in excess of a desired amount is discharged through a coating slit and is applied to the web, and an excess of coating liquid applied to excess is sucked up by a suction pump through a recovering slit provided on a downstream side of the coating slit in a running direction of the web, wherein: a pressure $P_{IN}$ (MPa) on a suction opening side of the suction pump is adjusted as $P_{IN} > -0.02$.

According to the present invention, in the coating method using two slits of the coating slit and the recovering slit, the pressure $P_{IN}$ (MPa) on the suction port side of the suction pump for sucking up an excess of coating liquid is adjusted as $P_{IN} \geq -0.02$, more preferably $P_{IN} \geq -0.01$. Thus, thickness variations in the web running direction of the coating layer formed on the web can be restrained. In this case, it is preferable that when a pressure loss ΔP (MPa) from the suction port of the recovering slit to the suction opening of the suction pump is adjusted as ΔP<0.07, more preferably ΔP<0.03.

The coating slit and the recovering slit may be formed in the same coating head. Alternatively, the configuration may be such that the coating head is formed with the coating slit only, and the recovering head formed with the recovering slit is provided separately to integrally arrange the coating head and the recovering head. Also, as a web used in the present invention, a web in which an undercoat is applied and solidified in advance may be used.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Preferred embodiments of a coating method in accordance with the present invention will now be described in detail with reference to the accompanying drawings.

Figure 1:
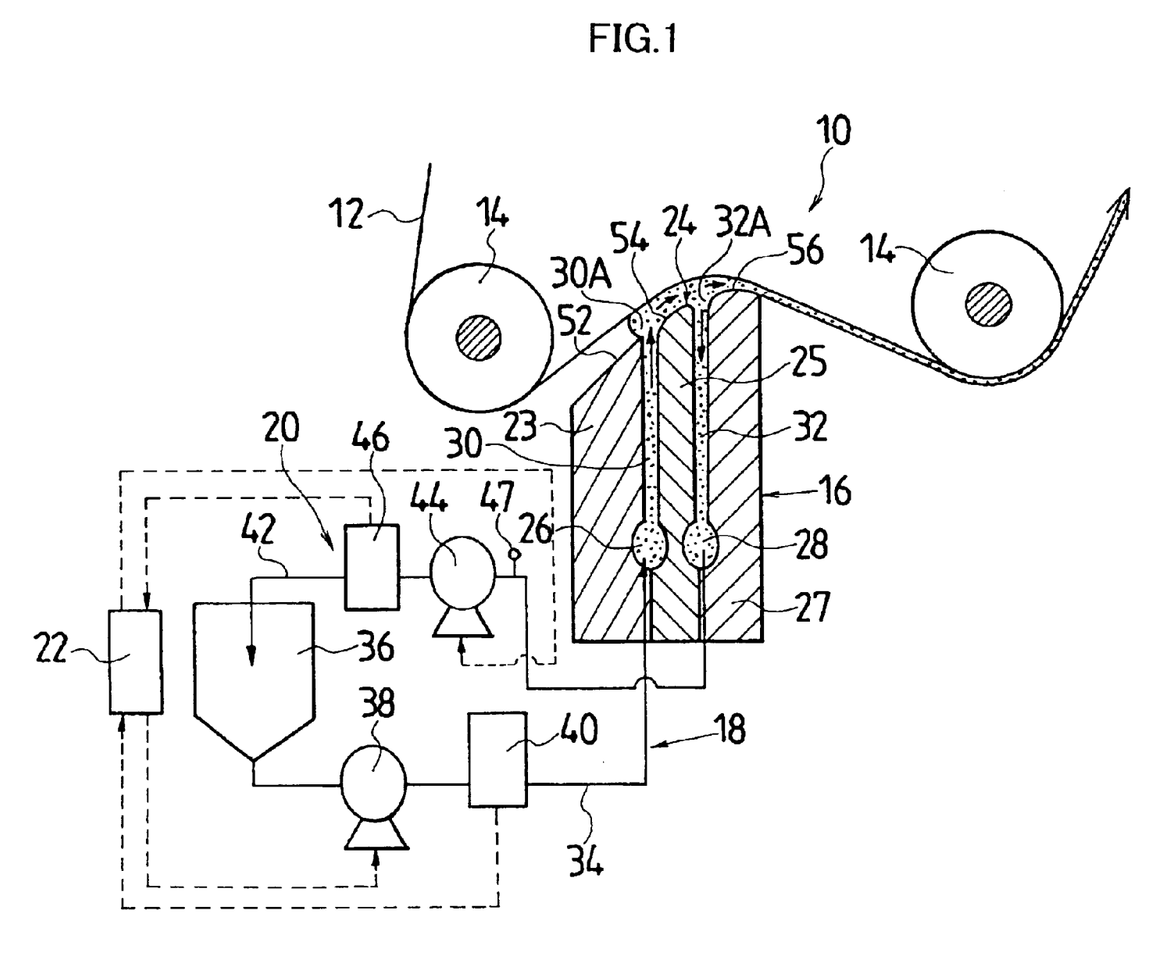
FIG. 1 is a schematic view for illustrating a general construction of a coating to apparatus to which a coating method in accordance with the present invention is applied.
Figure 2:
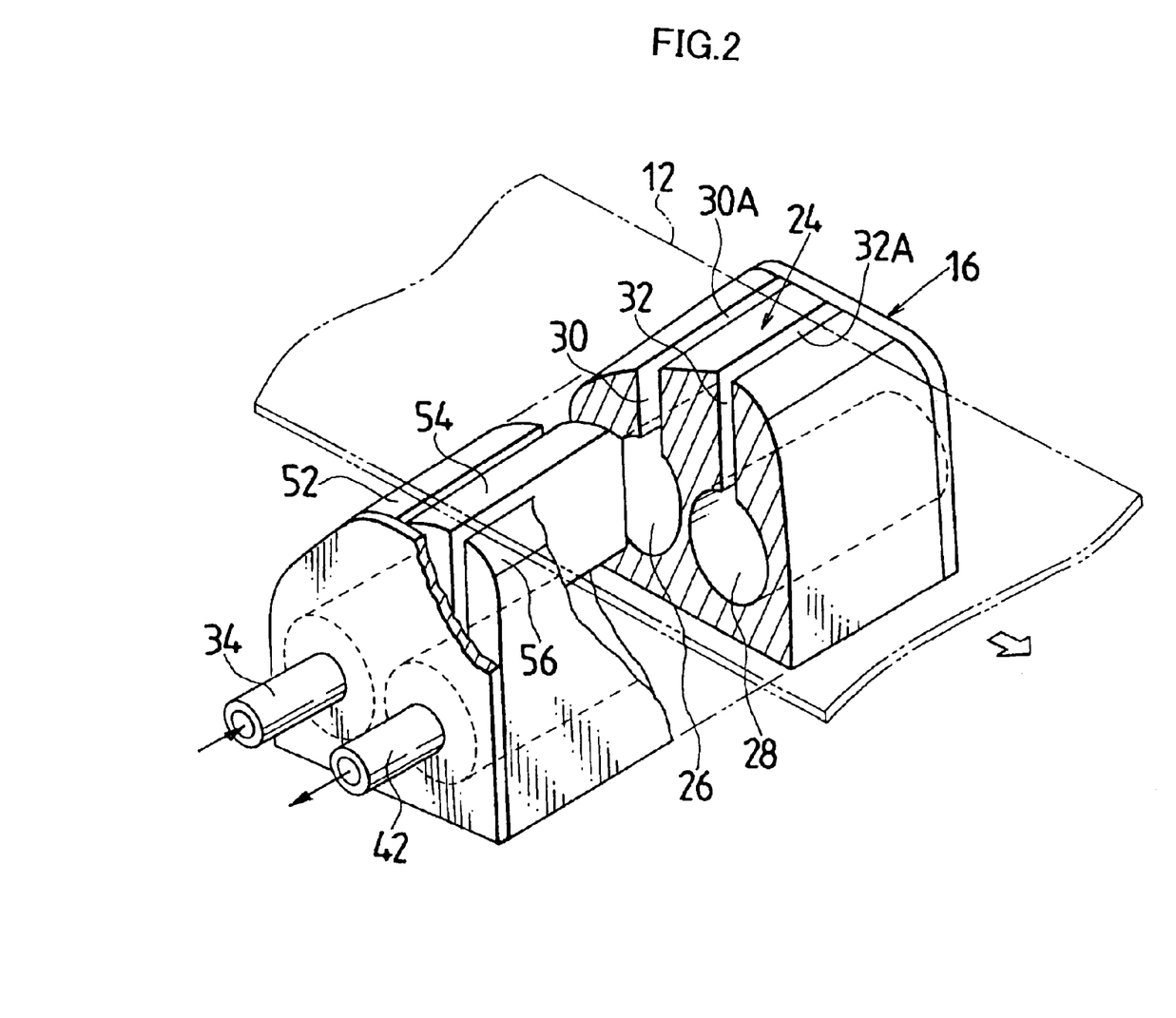
FIG. 2 is a perspective view for illustrating a coating head of the coating apparatus shown in FIG. 1.

FIG. 1 is a schematic view for illustrating a general construction of a coating apparatus to which a coating method in accordance with the present invention is applied, and FIG. 2 is an explanatory view for illustrating an extrusion type coating head. In this embodiment, explanation is given by taking an example in which two slits of a coating slit and a recovering slit are provided in the coating head.

As shown in FIG. 1, a coating apparatus 10 comprises support rollers 14 for guiding a running web 12, a coating head 16, a supplying line 18 for supplying a coating liquid to the coating head 16 in an amount in excess of the amount required for coating the web 12, a recovering line 20 for recovering an excess of coating liquid, and a controller 22 for controlling the supplying line 18 and the recovering line 20. The coating head 16 is arranged in such a manner as to face the continuously running web 12 with its lip surface 24 at the tip thereof being close to the web 12.

As shown in FIGS. 1 and 2, within the coating head 16, a pair of cylindrical pocket portions 26, 28 including a coating pocket portion 26 and a recovering pocket portion 28, are formed in parallel with each other in the web width direction. The coating pocket portion 26 is connected to the supplying line 18, and the recovering pocket portion 28 is connected to the recovering line 20. Within the coating head 16, a coating slit 30 having a discharge port 30A in the lip surface 24 and a recovering slit 32 having a suction port 32A in the lip surface 24 on the downstream side relative to the discharge port 30A as viewed along the running direction of the web 12 are also formed. The coating slit 30 and the recovering slit 32 are in communication with the coating pocket portion 26 and the recovering pocket portion 28, respectively. The coating slit 30 and the recovering slit 32 are narrow pathways connecting the respective pocket portions 26, 28 and the lip surface 24 and are extended in the widthwise direction of the web 12. A coating liquid is supplied from the supplying line 18 to the coating pocket portion 26 in an amount in excess of the desired amount to be applied to the web 12, and the excess amount of coating liquid having been recovered through the recovering slit 32 into the recovering pocket portion 28 is discharged into the recovering line 20. While one type of coating head is illustrated in FIG. 2 in which, as a method for pumping a coating liquid into the coating pocket portion 26, the coating liquid is supplied from one side of the coating pocket portion 26, there are other types in which a coating liquid is supplied from one side of the coating pocket portion 26 and drawn from the other side, or in which a coating liquid is supplied from a middle portion of the coating pocket portion 26 and branched into both sides. Any of these types of coating heads can be applied. Also, although a coating liquid is recovered from one side of the recovering pocket portion 28 in this embodiment, the coating liquid may be recovered from a middle portion of the recovering pocket portion 28.

The coating head 16 is constructed by combining three blocks 23, 25 and 27, and the pocket portions 26, 28 and the slits 30, 32 are formed by assembling the blocks 23, 25 and 27. The pocket portions 26, 28 must be formed so as to have a cross-sectional shape which prevents stagnation of coating liquid. The cross-sectional shape thereof should preferably be circular. The slits 30, 32 are generally parallel with each other in the range from the pocket portion 26, 28 to the discharge port 30A or the suction port 32A. However, the slits 30, 32 may be formed so that the distance therebetween decreases or increases toward the discharge port 30A or the suction port 32A. The slit gap of the slit 30, 32 is preferably set in the range of 0.05 to 2 mm at the position of the discharge port 30A or the suction port 32A. The coating slit 30 further preferably has a slit clearance in the range of 0.1 to 0.3 mm, and the recovering slit 32 in the range of 0.2 to 2 mm.

The lip surface 24 of the coating head 16 preferably uses an ultrahard material with Rockwell hardness of HkA85 such as cemented carbide and ceramics to increase the working accuracy and to restrain abrasion at the time of long-term use. Regarding the shapes of lip surfaces 52, 54 and 56 of the above-described three blocks 23, 25 and 27, the doctor lip surface 54 positioned in the middle and the recovering lip surface 56 positioned on the downstream side in the web running direction preferably have a circular shape having a proper radius of curvature for smoothing the coating liquid, and the radius of curvature (R) is preferably in the range of 0.5 mm to 20 mm. Therefore, an optimal radius of curvature in this range of radius of curvature should be set considering coating speed, coating thickness, coating liquid viscosity, and the like.

The supplying line 18 is such that its supplying piping 34 connects a coating liquid tank 36 and the coating pocket portion 26 of the coating head 16 and in the middle of the supplying piping 34 are provided a supplying pump 38 for supplying a coating liquid to the coating pocket portion 26 and a supplying flowmeter 40 for measuring the amount of coating liquid flowing through the supplying piping 34 as shown in FIG. 1. The rotational speed of a driving motor (not shown) for the supplying pump 38 can be controlled, and the flow rate is adjusted by controlling the rotational speed of the driving motor. The data from the supplying flowmeter 40 is input into the controller 22, and the controller 22 controls the rotational speed of the driving motor for the supplying pump 38 based on this data. Thereby, a feedback circuit is formed in the supplying line 18, so that a set amount of coating liquid is always supplied to the coating pocket portion 26 of the coating head 16.

The recovering line 20 is such that its recovering piping 42 connects the recovering pocket portion 28 and the coating liquid tank 36 and in the middle of the recovering piping 42 is provided a suction pump 44 for sucking up an excess of coating liquid into the recovering slit 32, a pressure gage 47 for measuring a liquid pressure on the suction opening side of the suction pump 44, and a recovering flowmeter 46 for measuring the amount of coating liquid sucked up into the recovering slit 32 and flowing through the recovering piping 42 to be recovered. The rotational speed of a driving motor (not shown) for the suction pump 44 can be controlled, and the flow rate is adjusted by controlling the rotational speed of the driving motor. The data from the recovering flowmeter 46 is input into the controller 22, and the controller 22 controls the rotational speed of the driving motor for the suction pump 44 based on this data. Thereby, a feedback circuit is formed in the recovering line 20, so that a set amount of coating liquid is always recovered. In this case, as a matter of course, the amount of coating liquid sucked up by the suction pump 44 is set so as to be smaller than the amount of coating liquid supplied by the supplying pump 38.

As the supplying pump 38 and the suction pump 44, a metering gear pump is preferably used.

The support rollers 14 are provided as a pair on both of the upstream and downstream sides relative to the coating head 16 in the web running direction, and arranged at positions lower than the tip of the coating head 16. Thus, the continuously running web 12 is brought close to the lip surface 24 of the coating head 16 in such a manner as to be pushed against the same. In this case, it is preferable that by varying the web tension in the web running direction, the pushing force which pushes the web 12 against the lip surface 24 can be varied. Also, it is preferable that the support rollers 14 be constructed so as to be capable of coming close to and going away from the lip surface 24 so that an approaching angle at which the running web 12 approaches the lip surface 24 of the coating head 16 and a leaving angle at which the web 12 leaves the lip surface 24 can be adjusted.

Figure 3:
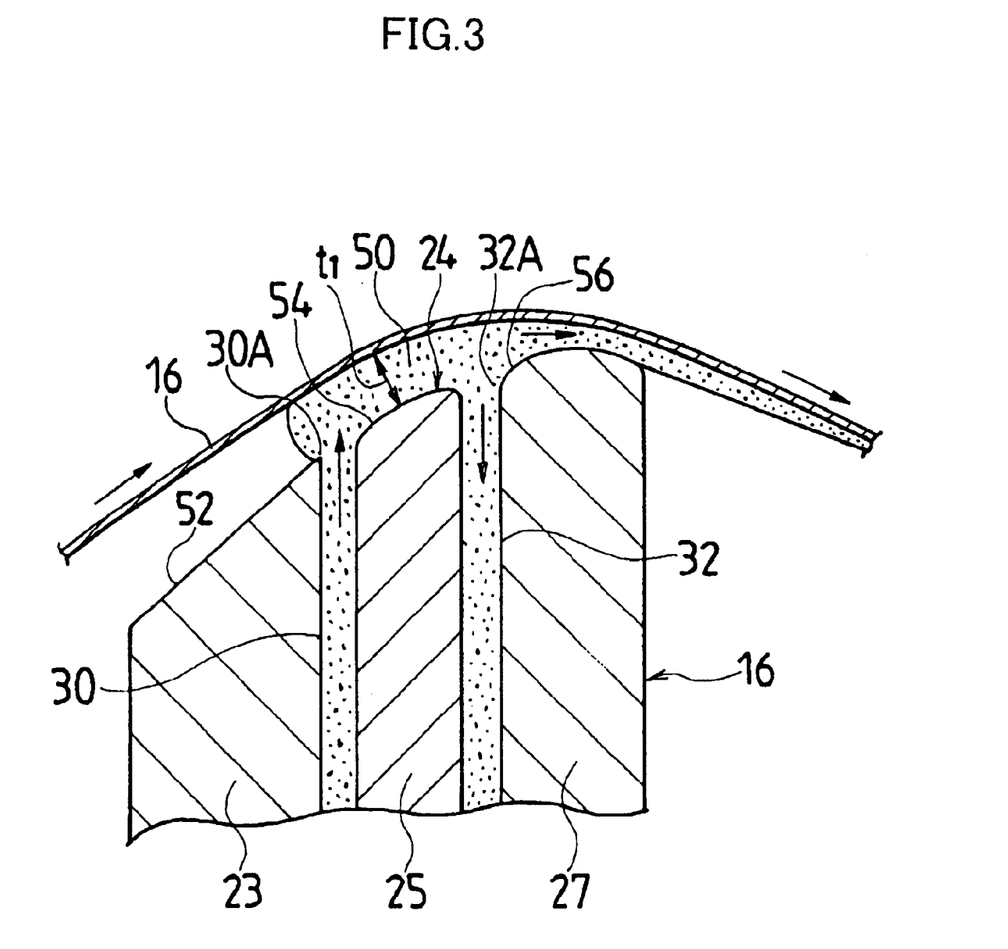
FIG. 3 is an explanatory view for illustrating a wet thickness $t_1$ of a coating liquid which is excessively discharged through a coating slit and applied to a web.

Into the controller 22 are input the measured values of the amount of the coating liquid supplied and the amount of the coating liquid recovered, which are measured with the supplying flowmeter 40 and the recovering flowmeter 46, respectively. Further, in the controller 22, an operation is conducted to determine whether or not a difference between the amount $Q_1$ of the coating liquid supplied and the amount $Q_2$ of the coating liquid recovered agrees with the desired amount of the coating liquid applied to the web 12. If the difference does not agree with the desired amount, the controller 22 controls at least one of the rotational speeds of the driving motors for the supplying pump 38 and the suction pump 44 to make both amounts agree with each other. In such rotational-speed controlling, by driving the supplying pump 38 and the suction pump 44, a circulation flow of coating liquid from the coating liquid tank 36 to the supplying piping 34 to the coating pocket portion 26 to the coating slit 30 to the recovering slit 32 to the recovering pocket portion 28 to the recovering piping 42 to the coating liquid tank 36 is formed. Since the amount $Q_1$ of the coating liquid supplied by the supplying pump 38 is larger than the amount $Q_2$ of the coating liquid recovered by the suction pump 44, the applied coating liquid is divided into coating liquid flowing through the recovering slit 32 and coating liquid flowing while accompanying the web 12 at a position of a suction port 32A of the recovering slit 32. Therefore, the controller 22 controls at least one of the rotational speeds of the driving motors for the supplying pump 38 and the suction pump 44 so that $Q_1-Q_2=Q$ is a desired amount of the coating liquid applied to the web 12. By decreasing the value of Q, a very thin coating layer can be obtained. In this case, as shown in FIG. 3, a wet thickness $t_1$ of the excess coating liquid between the web 12 and the doctor lip surface 54, of the back lip surface 52, the doctor lip surface 54, and the recovering lip surface 56 constituting the lip surface 24, that is, a wet thickness of the coating liquid before being sucked up with the recovering slit 32 is preferably 3 $cm^3/m^2$ or larger (indicated by the amount of coating liquid per square meter). The reason for this is that if the wet thickness $t_1$ is too small, a liquid pressure enough to exclude air accompanying the web $t_2$ is not produced, so that defects such as a score are liable to occur on the coating film surface finally obtained on the web 12.

The following is a description of the coating method of the coating apparatus 10 constructed as described above.

The coating liquid pumped out in excess from the coating liquid tank 36 by the supplying pump 38, and supplied to the coating pocket portion 26 of the coating head 16, rises up through the coating slit 30 and is discharged from the discharge port 30A. The coating liquid discharged from the discharge port 30A is applied to the web 12 while forming beads 50 between the lip surface 24 of the coating head 16 and the web 12 running adjacently to the lip surface 24. In other words, the coating liquid supplied to excess is applied to the web 12 in such a state that a discharge force which discharges the coating liquid from the discharge port 30A and a pushing force of the web 12 against the lip surface 24 of the coating head 16 are well balanced. Meanwhile, at the suction port 32A of the recovering slit 32 formed in the lip surface 24 on the downstream side relative to the discharge port 30A in the web running direction, an excess of coating liquid is sucked up into the recovering slit 32 by a suction force of the suction pump 44. The excess amount of coating liquid which is sucked up into the recovering slit 32 and accumulates in the recovering pocket portion 26 is recovered to the coating liquid tank 36 through the recovering line 20.

In coating with two slits of the coating slit 30 and the recovering slit 32 as described above, a liquid pressure P (MPa) at the suction port 32A through which an excess of coating liquid is sucked up is set so that the following inequality holds:

$$0.05 > P \geq 0 \tag{1}$$

Thereby, coating thickness variations in the web width direction of the coating layer formed on the web 12 can be restrained, and score-like coating omission can be prevented from occurring on the coating layer surface. If the liquid pressure P at the suction port 32A of the recovering slit 32 exceeds 0.05 MPa, the coating thickness variations in the web width direction of the coating layer formed on the web 12 become large. The reason for this is considered to be that the nonuniformity of pushing force of the web 12 against the lip surface 24 of the coating head 16 caused by nonuniform thickness of the web itself remarkably appears as the coating thickness variations. If the liquid pressure P is lower than 0

MPa, score-like coating omission easily occurs on the coating layer surface. The reason for this is considered to be that if the liquid pressure P is lower than the atmospheric pressure, the flow of the coating liquid flowing from the lip surface 24 into the recovering slit 32 becomes unstable. Therefore, the proper value of the liquid pressure P (MPa) is in the range of $0.05 > P \geq 0$, preferably in the range of $0.02 > P \geq 0$.

Also, a pressure $P_{IN}$ (MPa) on the suction opening side of the suction pump 44 for sucking up an excess of coating liquid through the recovering slit 32, that is, a pressure measured by the pressure gage 47 is set so that the following inequality holds:

$$P_{IN} \geq -0.02 \qquad (2)$$

Thereby, thickness variations in the web running direction of the coating layer formed on the web 12 can be restrained. If the pressure $P_{IN}$ is lower than $-0.02$ MPa, the thickness variations in the web running direction of the coating layer become extremely large. The reason for this is considered to be that cavitation is caused by the suction pump 44, and thus the amount of coating liquid sucked up into the recovering slit 32 pulsates. Therefore, the proper value of $P_{IN}$ (MPa) is $P_{IN} \geq -0.02$, preferably $P_{IN} \geq -0.01$.

Also, as a result derived from the above-described relationship, the proper value of a pressure loss $\Delta P$ (MPa) from the suction port 32A of the recovering slit 32 to the suction opening side of the suction pump 44 is $\Delta P < 0.07$, preferably $\Delta P > -0.03$.

As described above, according to the present invention, in coating with two slits of the coating slit 30 an the recovering slit 32 in the coating head 16, the pressure condition for sucking tip an excess of coating liquid with the recovering slit 32 can be optimized, so that a coating layer with a very small and even thickness can be obtained. Thereupon, the coating apparatus 10 according to the coating method of the present invention is suitable as a coating apparatus for obtaining an even and very thin magnetic layer required in manufacturing magnetic recording media, and is especially suitable for a very thin coat in which the wet thickness of magnetic coating liquid applied to the web 12 is 2 µm or smaller.

EXAMPLES

Tests were conducted to determine how three pressures of the liquid pressure P (MPa) at the suction port of the recovering slit, the pressure $P_{IN}$ (MPa) on the suction opening side of the suction pump, and the pressure loss $\Delta P$ (MPa) from the suction port of the recovering slit to the suction opening of the suction pump exert an influence on the thickness variations and surface quality state of the coating layer formed on the web in coating with two slits of the coating slit and the recovering slit. As a material for the lip surface, WC—Co alloy with a particle diameter of main component of 1 µm was used.

The above-described three pressures were measured and calculated as described below.

Figure 4:
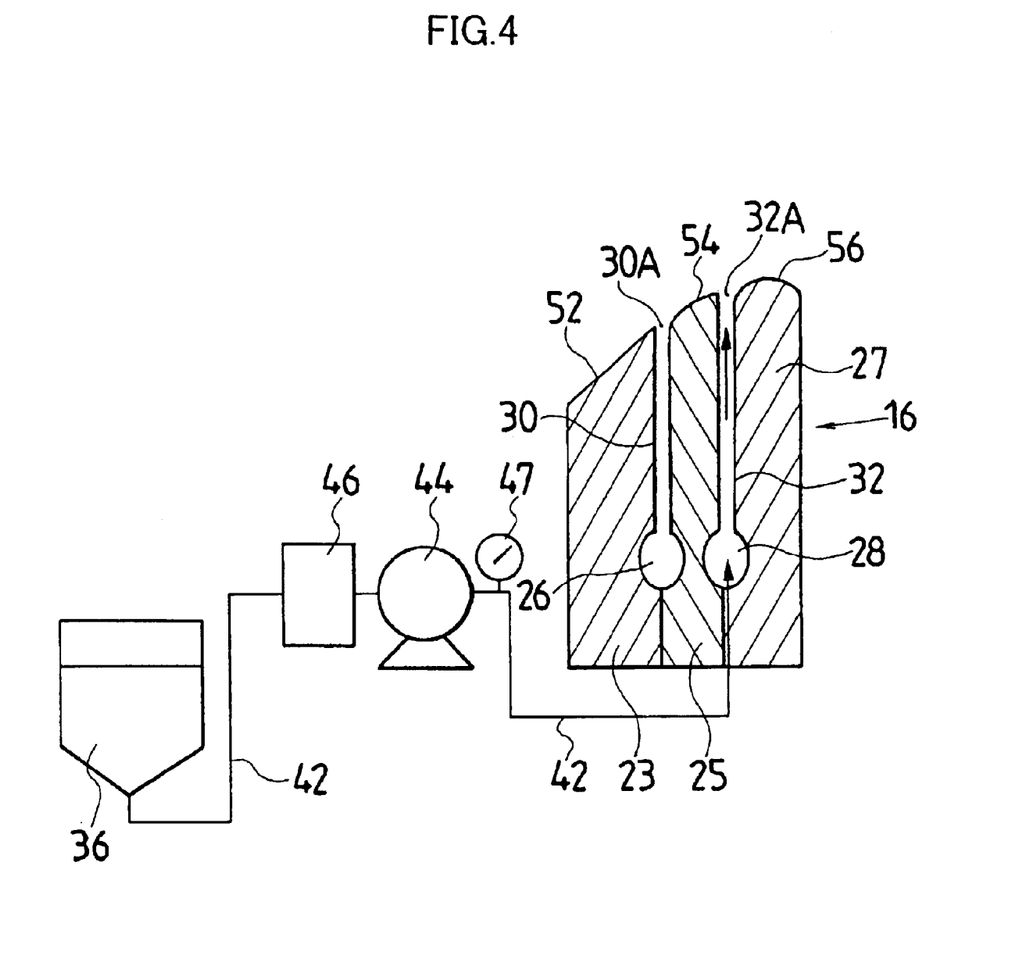
FIG. 4 is an explanatory view for illustrating how to connect a suction pump to measure a pressure loss ΔP (MPa) from the suction port of a recovering slit to the suction opening side of a suction pump.

The pressure $P_{IN}$ (MPa) was measured by connecting the suction pump to the coating head as in the case where the coating operation in FIG. 1 is performed, performing ordinary coating operation while running the web, and reading the value of pressure on the pressure gage at a predetermined amount of liquid supplied and sucked up. To measure the pressure loss $\Delta P$ (MPa), the discharge opening side of the suction pump was connected to the coating head and the suction opening side thereof was connected to the coating liquid tank inversely relative to the coating operation, as shown in FIG. 4. A flow amount that was the same as the amount of coating liquid sucked up from the recovering slit at the time of coating operation was continuously supplied to the recovering slit that was in a state of being opened to the atmosphere, and the pressure loss was measured by reading the value on the pressure gage at this time. The pressure P was determined by summing up $P_{IN}$ and $\Delta P$.

Also, the pressure loss $\Delta P$ (MPa) was varied by changing the rotational speed of the driving motor for the suction pump arranged on the recovering line. Further, since the pressure P is changed by changing the radius of curvature of the recovering lip surface, the radius of curvature of the recovering lip surface (R) was changed into five test sections of 2 mm, 4 mm, 6 mm, 8 mm and 10 mm, and under the condition of each test section, $P_{IN}$, $\Delta P$ and P were determined, and the thickness variations in the web running direction and the thickness variations in the web width direction of the coating layer formed on the web were measured. In addition, the surface quality of coating layer surface was observed.

The composition of the coating liquid subjected to the test is as given in Table 1, and the coating conditions are as given in Table 2. The thickness of the coating layer formed on the web was set at 2 µm in wet thickness.

TABLE 1

| Composition of coating liquid | Part by weight |
|---|---|
| Co substituted barium ferrite (BET specific surface area 35 m²/g, average particle diameter 0.06 µm, plate ratio 5) | 35 |
| Vinyl chloride copolymer (polymerization degree 300) | 9 |
| CrO₂ (average particle diameter 0.3 µm) | 7 |
| Polyester polyurethane resin (average molecular weight 35000) | 10 |
| Carbon black (average particle diameter 30 µm) | 5 |
| Toluene | 36 |
| Cyclohexane | 36 |

After a coating liquid having the composition given in Table 1 was kneaded and dispersed in a predetermined manner, an organic solvent was added appropriately and mixed homogeneously, and the obtained coating liquid was used for the test. Although a magnetic coating liquid was used in this example, the type of coating liquid is not limited to this type.

TABLE 2

| Coating condition | Setting |
|---|---|
| Shape of back lip surface | Flat surface |
| Shape of doctor lip surface | Radius of curvature 10 mm |
| Shape of recovering lip surface | Five test sections of radius of curvature 2 mm, 4 mm, 6 mm, 8 mm and 10 mm |
| Web | 30 µm thick polyethylene |
| Coating speed | 100 m/mm |
| Coating width | 0.3 m |
| Delivery of supplying pump | 300 cm³/min |
| Suction rate of suction pump | 240 cm³/min |
| Wet thickness of coating layer | 2 µm |

Table 3 gives the test result. As for the evaluation standard, a coating thickness variation in the web running direction smaller than 8% was graded as A, a variation between 8% and 12% as B, and a variation larger than 12% as F. Also, a thickness variation in the web width direction smaller than 12% was graded as A, a variation between 12% and 20% as B, and a variation larger than 20% as F.

TABLE 3

| Radius of curvature of recovering lip surface (mm) | $P_{IN}$ (MPa) | $\Delta P$ (MPa) | P (MPa) | Coating thickness variations in the web running direction | Coating thickness variations in the web width direction | Surface quality of coating layer |
|---|---|---|---|---|---|---|
| 2 | 0.08 | 0.02 | 0.10 | A | F | Good |
| 4 | 0.03 | 0.02 | 0.05 | A | B | Good |
| 4 | 0.01 | 0.04 | 0.05 | A | B | Good |
| 6 | 0 | 0.02 | 0.02 | A | A | Good |
| 8 | −0.02 | 0.02 | 0.00 | B | A | Good |
| 10 | −0.03 | 0.02 | −0.01 | F | Unmeasurable | Score-like coating omission |
| 6 | −0.01 | 0.03 | 0.02 | A | A | Good |
| 6 | −0.02 | 0.03 | 0.02 | B | A | Good |
| 6 | −0.03 | 0.04 | 0.02 | F | A | Good |

As seen from the result shown in Table 3, when the liquid pressure P at the suction port of the recovering slit was in the range of 0.05>P≧0, the coating thickness variations in the web width direction of the coating layer formed on the web were small, and hence a good result could be obtained. Especially when the pressure P was in the range of 0.02>P≧0, a better result could be obtained.

When the liquid pressure P at the suction port of the recovering slit exceeded 0.05 MPa, the coating thickness variations in the web width direction of the coating layer formed on the web were large. The reason for this is considered to be that the nonuniformity of pushing force against the coating head caused by nonuniform thickness of the web itself becomes remarkable. When the pressure P was lower than 0 MPa, score-like coating omission occurred on the coating layer surface. The reason for this is considered to be that if the pressure P is lower than the atmospheric pressure, the flow of coating liquid from the lip surface into the recovering slit becomes unstable.

This result means that in coating with two slits of the coating slit and the recovering slit, the proper value of P (MPa) is in the range of 0.05>P≧0, preferably in the range of 0.02>P≧0.

Also, as seen from Table 3, when the pressure $P_{IN}$ on the suction opening side of the suction pump was $P_{IN}$≧−0.02 MPa, the coating thickness variations in the web running direction of the coating layer formed on the web were small, and hence a good result could be obtained. Especially when the pressure $P_{IN}$ was $P_{IN}$≧−0.01 MPa, a better result could be obtained.

When the pressure $P_{IN}$ on the suction opening side of the suction pump was lower than −0.02 MPa, the thickness variations in the web running direction of the coating layer became extremely large. The reason for this is considered to be that cavitation is caused by the suction pump, and thus the amount of coating liquid sucked up into the recovering slit pulsates.

This result means that the proper value of $P_{IN}$ (MPa) is $P_{IN}$≧−0.02 MPa, preferably $P_{IN}$≧−0.01 MPa. Also, the pressure loss ΔP (MPa) from the suction port of the recovering slit to the suction opening of the suction pump is ΔP<0.07 MPa, preferably ΔP<0.03 MPa.

Although the pressure loss ΔP was adjusted by the rotational speed of the driving motor for the suction pump in this example, the configuration is not limited to this. The pressure loss ΔP can be divided mainly into three: a pressure loss $\Delta P_s$ in the recovering slit, a pressure loss $\Delta P_p$ in the pocket portion, and a pressure loss $\Delta P_h$ in the piping from the pocket outlet to the suction opening of the suction pump ($\Delta P = \Delta P_s + \Delta P_p + \Delta P_h$). Therefore, in order to decrease the pressure loss ΔP, any of $\Delta P_s$, $\Delta P_p$ and $\Delta P_h$ has only to be decreased. For example, the decrease in $\Delta P_s$ can be achieved by widening the slit width, the decrease in $\Delta P_p$ can be achieved by increasing the diameter of the pocket portion, and the decrease in $\Delta P_h$ can be achieved by increasing the piping diameter or by shortening the length of piping. Further, the decrease in ΔP can be achieved by decreasing the viscosity of coating liquid or by decreasing the flow rate. Anyway, the operation of the highest pressure loss of $\Delta P_s$, $\Delta P_p$ and $\Delta P_h$ is effective.

According to the coating method in accordance with the present invention, in coating with two slits of the coating slit and the recovering slit, by optimizing the pressure condition for sucking up an excess of coating liquid with the recovering slit, a coating layer with a very small and even thickness can be obtained.

Thereupon, the coating method in accordance with the present invention is suitable as a coating method for obtaining an even and very thin magnetic layer required in manufacturing magnetic recording media, and is especially suitable for a very thin coat in which the wet thickness of magnetic coating liquid applied to the web is 2 μm or smaller.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A coating method in which in a state where a continuously running web is brought close to a lip surface at a tip of a coating head, a coating liquid sent into the coating head in excess of a desired amount is discharged through a coating slit and is applied to the web, and an excess of coating liquid applied to excess is sucked up through a recovering slit provided on a downstream side of the coating slit in a running direction of the web, wherein:
   a liquid pressure P (MPa) at a suction port of the recovering slit is adjusted in a range of 0.05>P≧0.

2. The coating method as defined in claim 1, wherein the liquid pressure P (MPa) is adjusted in a range of 0.02>P≧0.

3. A coating method in which in a state where a continuously running web is brought close to a lip surface at a tip of a coating head, a coating liquid sent into the coating head in excess of a desired amount is discharged through a coating slit and is applied to the web, and an excess of coating liquid applied to excess is sucked up by a suction pump through a recovering slit provided on a downstream side of the coating slit in a running direction of the web, wherein:

a pressure $P_{IN}$ (MPa) on a suction opening side of the suction pump is adjusted as $P_{IN} \geq -0.02$.

4. The coating method as defined in claim 3, wherein the pressure $P_{IN}$ (MPa) is adjusted as $P_{IN} \geq -0.01$.

5. The coating method as defined in claim 3, wherein a pressure loss $\Delta P$ (MPa) from a suction port of the recovering slit to the suction opening of the suction pump is adjusted as $\Delta P < 0.07$.

6. The coating method as defined in claim 5, wherein the pressure loss $\Delta P$ (MPa) is adjusted as $\Delta P < 0.03$.

* * * * *